(12) United States Patent
Harris

(10) Patent No.: US 7,020,370 B2
(45) Date of Patent: Mar. 28, 2006

(54) THREE COLOR DIGITAL GOBO SYSTEM

(75) Inventor: Jerry J. Harris, Las Vegas, NV (US)

(73) Assignee: Production Resource Group, L.L.C., New Windsor, NY (US)

( * ) Notice: Subject to any disclaimer, the term of this patent is extended or adjusted under 35 U.S.C. 154(b) by 0 days.

(21) Appl. No.: 10/995,612

(22) Filed: Nov. 22, 2004

(65) Prior Publication Data

US 2005/0100289 A1   May 12, 2005

Related U.S. Application Data

(63) Continuation of application No. 10/616,481, filed on Jul. 8, 2003, now Pat. No. 6,823,119, which is a continuation of application No. 09/771,953, filed on Jan. 29, 2001, now Pat. No. 6,588,944.

(51) Int. Cl.
*G02B 6/44* (2006.01)
*G02B 26/00* (2006.01)
*G09F 13/00* (2006.01)

(52) U.S. Cl. .............. 385/100; 385/115; 385/116; 385/88; 385/147; 385/901; 359/291; 362/232; 362/551; 362/556

(58) Field of Classification Search ........... 385/88, 385/89, 92, 49, 115, 116, 14, 147, 901, 37, 385/100; 359/291, 223, 224; 382/217, 220, 382/190; 348/241, 246, 239; 362/232, 551, 362/556, 293, 296
See application file for complete search history.

(56) References Cited

U.S. PATENT DOCUMENTS

| | | | |
|---|---|---|---|
| 5,053,765 A | 10/1991 | Sonehara et al. | 340/815.31 |
| 5,828,485 A | 10/1998 | Hewlett | 359/291 |
| 5,940,204 A | 8/1999 | Hewlett | 359/298 |
| 6,057,958 A | 5/2000 | Hunt | 359/291 |
| 6,188,933 B1 | 2/2001 | Hewlett et al. | 700/19 |
| 6,208,087 B1 | 3/2001 | Hughes et al. | 315/291 |
| 6,256,136 B1 | 7/2001 | Hunt | 359/291 |
| 6,538,797 B1 | 3/2003 | Hunt | 359/291 |
| 6,588,944 B1 | 7/2003 | Harris | 385/88 |
| 6,617,792 B1 * | 9/2003 | Hughes et al. | 315/32 |
| 6,823,119 B1 * | 11/2004 | Harris | 385/100 |
| 6,891,656 B1 * | 5/2005 | Hunt | 359/291 |

* cited by examiner

*Primary Examiner*—Brian M. Healy
(74) *Attorney, Agent, or Firm*—Fish & Richardson P.C.

(57) ABSTRACT

A system of digitally controlling light output by producing separate control signals for different colors of light. The light is contained in an optical waveguide, either prior to shaping or after shaping. Each of the control signals is coupled to a digitally controlled device which controls the shape of the light output. The digital controlling device can be digital mirror devices, for example.

104 Claims, 2 Drawing Sheets

THREE COLOR DIGITAL GOBO SYSTEM

CROSS-REFERENCE TO RELATED APPLICATIONS

This application is a continuation application of and claims priority to U.S. application Ser. No. 10/616,481, filed Jul. 8, 2003, now U.S. Pat. No. 6,823,119, which is a continuation of U.S. application Ser. No. 09/771,953, filed Jan. 29, 2001, now issued U.S. Pat. No. 6,588,944.

BACKGROUND

The U.S. Pat. No. 5,940,204 has suggested using a digital device to shape the contour and outlines of light that is projected through a high-intensity projector. Such a system may be used, for example, for stage lighting in theatrical and concert events. The Icon M™, available from Light and Sound Design, Ltd; Birmingham, England, uses this technique.

Different patents owned by Light and Sound Design, Ltd. suggest that the digital gobo should be formed from either a digital mirror, or from any other pixel level controllable digital device.

Cogent Light of Los Angeles, Calif. has technology that allows packaging a high intensity light beam into a form that allows it to be placed into a light waveguide, e.g., a fiber optic cable.

SUMMARY

The present application teaches a system of packaging light into a light waveguide such as a fiber optic cable, and adjusting the shape of the light using a digitally controllable, pixel level controllable light shaping element, such as a digital mirror device (DMD), available from Texas Instruments.

In one embodiment, the system controls and produces high-intensity light output using three separate digital gobo devices. The digital gobo devices can be separately controlled such that each digital gobo device receives information indicative of shaping a separate primary color. The primary colors are handled separately, and/or combined at the object of the high-intensity light output.

BRIEF DESCRIPTION OF THE DRAWINGS

These and other aspects will now be described in detail with reference to the accounts, wherein.

DETAILED DESCRIPTION

Details of a lighting instrument using a digital gobo are described in many patents owned by Light and Sound Design Ltd and the basic features are also present in Light and Sound Design's Icon M™ lighting fixture. The system described herein may use any of these basic features including details of computer-controlled cooling, and optics.

Figure 1:
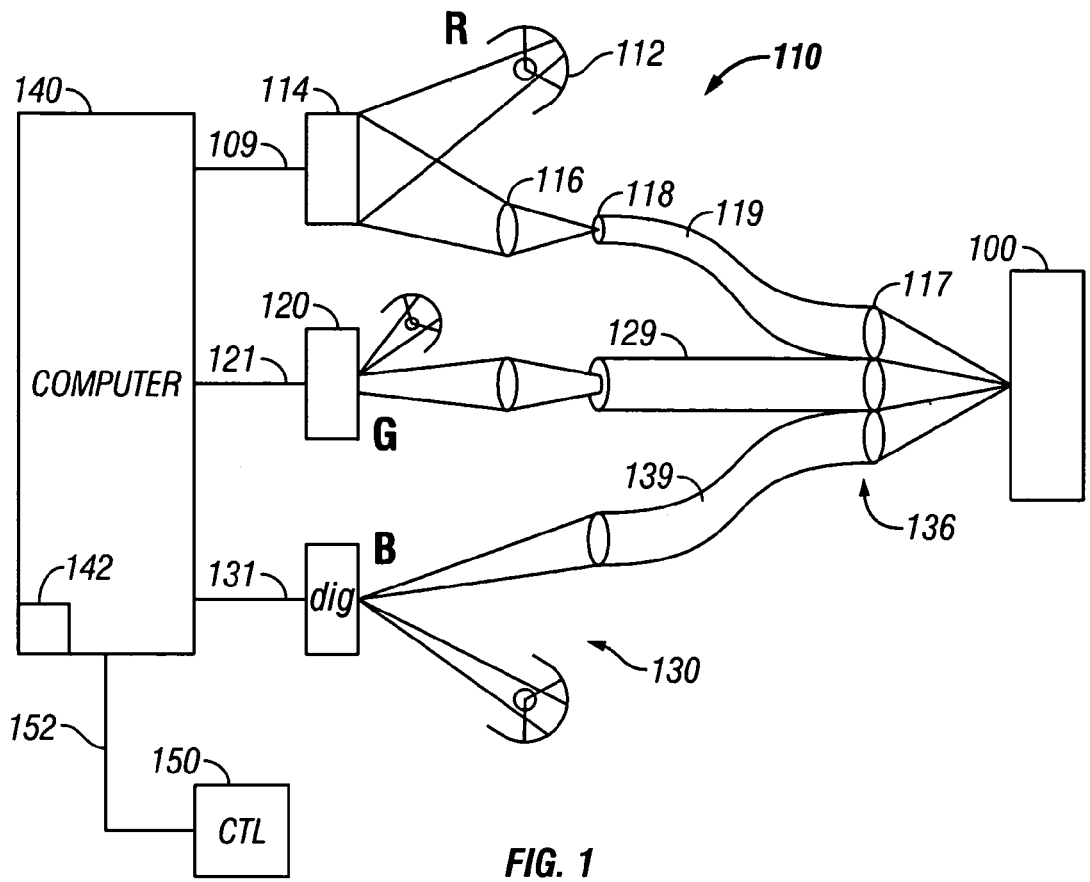
FIG. 1 is a block diagram of a three color version of the system.

A block diagram of the basic system is shown in FIG. 1. An object of lighting 100 is shown. This object may be a stage, or may be any other object which is conventionally by a high-intensity lighting device. The high-intensity lighting device may be, for example, a lighting device which produces more than 100 watts of lighting output, preferably more than 500 watts of lighting output. Devices of this type conventionally use a spotlight with a special high intensity bulb for producing the desired illumination effect.

In FIG. 1, three separate lighting units are formed. Each lighting unit is responsible for producing light of a separate primary color. The primary colors can be red, green and blue for additive colors, and cyan, magenta and yellow for subtractive coloration.

Each of the lighting units 110, 120 and 130 are formed of similar structure. The lighting unit 110 includes a light source 112 which produces light of a specified primary color, here red. The lighting unit 110 may produce red coloration, or may include a white light with a red filter, or may even produce pure white light which is later filtered. The light from source 112 is applied to digital gobo device 114. The digital gobo device 114 may be a digital mirror device available from Texas Instruments. Alternatively, the digital mirror device can be some other digitally controllable, pixel level controllable optical device such as, but not limited to, a grating light valve. The digital gobo device 114 is a controlling computer 140 which runs a specified program 142. A controller 150 may be remote from the computer 140, and connected to the computer by a line 152. For example, the computer 140 may be within a separate lighting fixture along with the lighting elements 110, 120 and 130, and a remote central controller 150 may be a lighting control console.

The light output from the digital mirror device 114 is focused by an optics assembly 116, and focused to the input end 118 of an optical waveguide 119. The optical waveguide 119 may be, for example, a fiber-optic device including single or multiple fibers. The light input at end 119 is output at end 117, and coupled towards the object 100. Analogously, the other lighting unit 120 focuses its light onto a fiber-optic device 129, and the lighting device 130 focuses its light onto a fiber-optic device 139. Each of the lights may have different characteristics, i.e. they may have different coloration. The output of the three fiber-optic devices 119, 129 and 139 are bundled together at area 136, and are pointed towards the object of lighting 100.

In this way, a number of advantages may be obtained. First, brighter light and different kinds of control may be obtained since the system disclosed herein uses three separate light sources. Moreover, better control over the digital gobo may be obtained since red; green and blue are separately controlled. Less flickering may be obtained, and more brightness, as compared with a system that uses only one DMD. Still a system that uses only one DMD is contemplated as described herein.

Different modifications on this system are possible. Other optical waveguides besides a fiber-optic pipe may be used in this system. Moreover, the optical filter which changes each of these separate light components to a separate light characteristic may be located after the digital mirror, e.g. as part of the optics assembly 116, or on the input end of the fiber-optic device 118.

Figure 2:
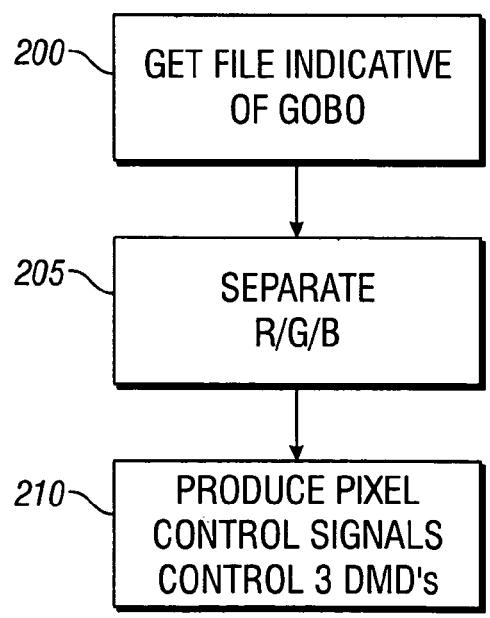
FIG. 2 shows a flowchart of operation of the controlling process for the digital gobo's in FIG. 1.

The system is controlled according to the flowchart of FIG. 2. At 200, a file indicative of a shaping of the light, e.g. a gobo to be used, is obtained. This file may be, for example, of the format described in U.S. Pat. No. 6,057,958. Of course, any file format can be used to define the gobo. The definition can be monochrome, gray scale, or full color (three different colors). At 205, the file is changed to an image, and separated into its primary color components. In the example given herein, the primary color components may include red, green and blue. Hence the file is separated into red, green and blue components. Such separation is conventional in video processing, and produces three separate signals. These three separate signals will eventually be used as the three separate controlling signals 109, 121 and 131 respectively driving the red green and blue subassemblies. The control of the three separate digital mirror devices is carried out at 210.

Figure 3:
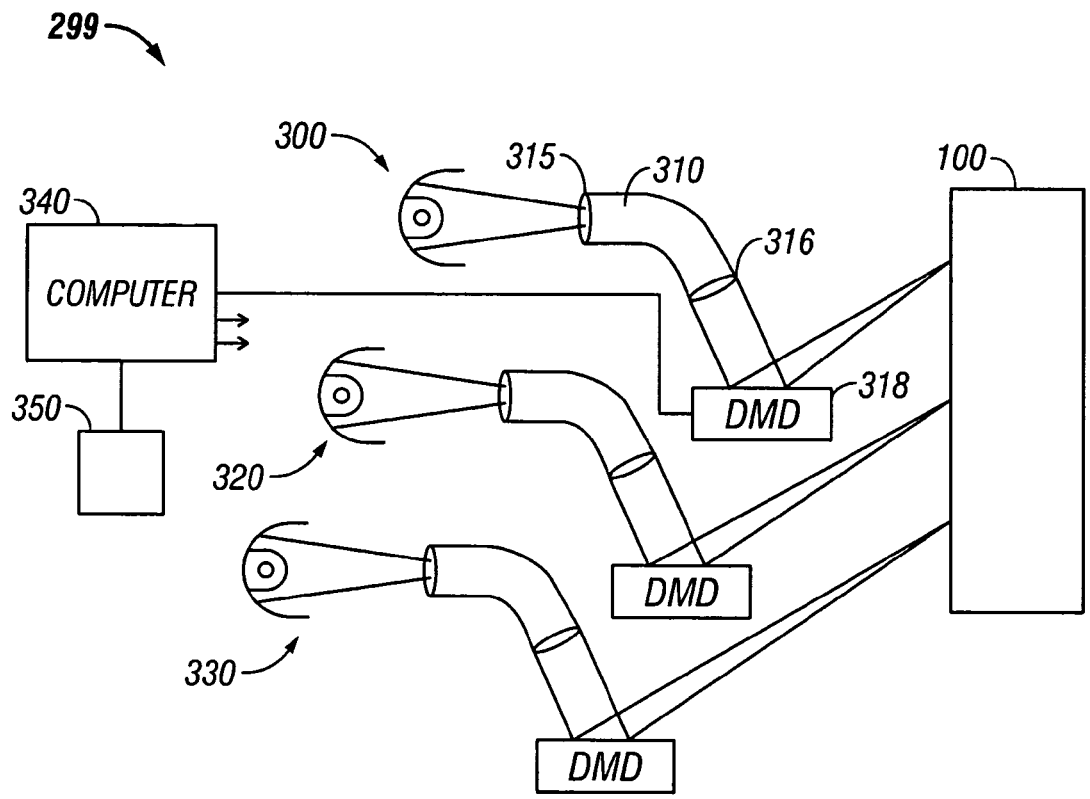
FIG. 3 shows a 3 DMD solution using three optical pipes.

FIG. 3 shows an alternative embodiment which uses a similar concept. In the FIG. 3 embodiment, light is first launched from a light source 300 directly into a fiber-optic cable 310. In this embodiment, the optics are shown as 315, and are formed directly on the input end of the fiber-optic cable 310. Light is launched into the fiber-optic cable, and hence may be focused and or colored by the optics 315. Of course, this system may also use the separate optics shown as 116 in the FIG. 1 embodiment. Light is output on the output in 316 of the fiber-optic cable 310, and coupled to a digital mirror device 318 which shapes the light and reflects it towards the object 100.

The above has described a first channel shown as 299. A separate second channel 320 produces a similar light alteration for the second aspect of light, while a third channel 330 produces a separate output for the third aspect of light; where the aspects can be colors. Each of the digital mirror devices may be controlled by the computer shown as 340 which may be controlled from a remote console 350.

While the above has described control using three separate colors, it should be understood that two separate colors could also alternatively be used. Moreover, while the above describes the different aspects of light which are separately controlled being colors, it should be understood that any different aspect of shaping the beam of light could be separately controlled. For example, one alternative might use different intensity lights, each of which are separately controlled to produce some other kind of effect.

Figure 4:
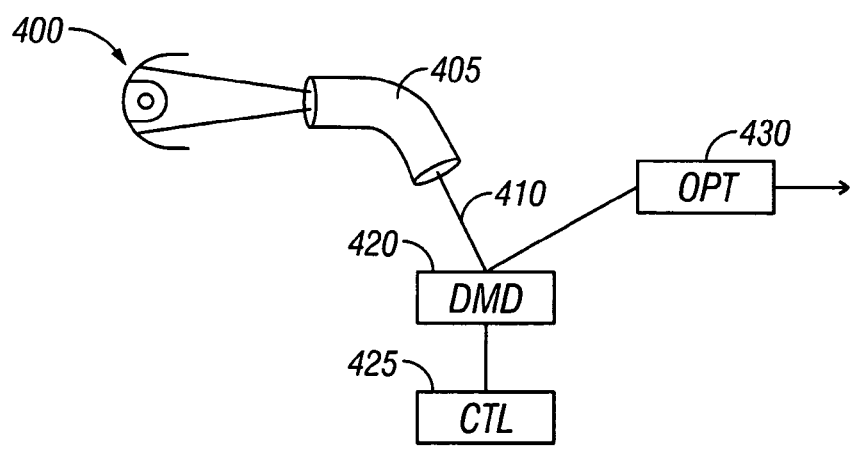
FIG. 4 for shows a single DMD solution.

Another embodiment is shown in FIG. 4. In this embodiment, a single DMD solution is shown. Light from the light 400 is immediately launched into an optical waveguide, e.g. fiber 405. The fiber can be located in any configuration. It produces its light output 410 at the area of DMD 420. As conventional, the DMD is controlled by a controller 425. An optical assembly 430 receives the light from the DMD, and transmits it towards the object of illumination. The optical element 430 may include a color changing element therein, or multiple color changing elements, in order to produce full-color output. For example, the optical element 430 may include a spinning Red/Green/Blue filter which spins in synchronism with the changing of patterns on the DMD.

Although only a few embodiments have been disclosed in detail above, other modifications are possible. All such modifications are intended to be encompassed within the following claims, in which:

What is claimed is:

1. A method, comprising:
   using a computer to process a digital file indicative of a color gobo shape to be projected;
   producing outputs which are adapted to simultaneously control at least two digital light shape altering devices to states indicative of said color gobo shape for each of two different colors.

2. A method as in claim 1, further comprising using said outputs to control at least two light shape altering devices.

3. A method as in claim 2, further comprising using said light shape altering devices to alter a shape of light which is passed.

4. A method as in claim 3, further comprising combining light which has been shaped by said at least two light shape altering devices into a composite light shape.

5. A method as in claim 3, wherein said producing produces outputs for at least three light shape altering devices, and wherein said using comprises using said three light shape altering devices to shape a beam of light.

6. A method as in claim 4, further comprising providing a first primary color of light to a first light shape altering device, and a second primary color of light to a second light shape altering device.

7. A method as in claim 2, further comprising providing colored light to said light shape altering devices, wherein said providing comprises filtering white light to provide said colors of light.

8. A method as in claim 1, wherein said producing simultaneously produces output signals respectively indicative of different color components of the color gobo shape.

9. A method as in claim 1, wherein said digital light shape altering devices are digital mirror devices, and said outputs comprises two separate outputs which respectively drive two separate digital mirror devices.

10. A method as in claim 1, further comprising projecting a light beam of an intensity of 500 watts or greater, based on said outputs.

11. A method as in claim 6, wherein said providing comprises providing said light over fiber optic cables.

12. A method as in claim 1, further comprising projecting a light beam that is shaped based on said digital file.

13. A method, comprising:
   using a computer to process a digital file indicative of a composite light beam, that includes at least one shaped part therein, to be projected; and
   producing outputs which are adapted to simultaneously control at least two digital light altering devices to different states, indicative of said composite light beam, and wherein at least one of said outputs represents a shape of said composite light beam.

14. A method as in claim 13, further comprising using said outputs to control at least two light altering devices.

15. A method as in claim 14, further comprising using at least one of said light altering devices to alter a shape of light which is passed.

16. A method as in claim 14, further comprising providing light to said at least two light altering devices and, combining light output from said at least two light altering devices, into a composite light shape.

17. A method as in claim 14, wherein said producing, produces outputs for at least three light altering devices, and wherein said using comprises using at least one of said three light altering devices to shape a beam of light.

18. A method as in claim 16, wherein said providing comprises providing a first primary color of light to a first light altering device, and a second primary color of light to a second light altering device.

19. A method as in claim 14, further comprising providing colored light to said light shape altering devices, wherein said providing comprises filtering white light to provide said colors of light.

20. A method as in claim 13, wherein said producing simultaneously produces output signals respectively indicative of different color components of the color gobo shape.

21. A method as in claim 13, wherein said light altering devices are digital mirror devices, and said outputs comprises two separate outputs which respectively drive two separate digital mirror devices.

22. A method as in claim 18, wherein said providing comprises providing said light over fiber optic cables.

23. A method, comprising:
using a computer to process at least one digital file indicative of a composite light beam formed of first and second image parts; and
producing outputs which are adapted to simultaneously control at least two digital, pixel-level controllable, light altering devices to different states, indicative of said composite light beam formed of both said first image part and said second image part.

24. A method as in claim 23, wherein at least one of said first and second image parts are an image of a gobo shape.

25. A method as in claim 23, further comprising using said outputs to control at least two light altering devices.

26. A method as in claim 23, further comprising providing light to said light shape altering devices, and combining light which has been modified by said at least two light altering devices into a composite light shape.

27. A method as in claim 23, wherein said producing, produces outputs for at least three light altering devices whose states collectively define the output light beam.

28. A method as in claim 23, further comprising providing a first color of light to a first light altering device, and a second color of light to a second light altering device.

29. A method as in claim 28, wherein said providing colored light comprises filtering white light to provide said colors of light.

30. A method as in claim 23, wherein said producing simultaneously produces output signals respectively indicative of different color components of the composite light beam.

31. A method as in claim 23, wherein said digital light altering devices are digital mirror devices, and said outputs comprises two separate outputs which respectively drive two separate digital mirror devices.

32. A method as in claim 28, wherein said providing comprises providing said light over fiber optic cables.

33. A method, comprising:
using a computer to process a digital file indicative of a composite light beam formed of first and second image parts; and
producing outputs which are adapted to simultaneously control at least two pixel level controllable digital light altering devices to different states, indicative of said composite light beam, and wherein said outputs represents states of image portions of different intensities.

34. A method as in claim 33, further comprising using said outputs to control at least two light altering devices.

35. A method as in claim 34, further comprising using said light altering devices to alter a shape of light which is passed.

36. A method as in claim 35, further comprising combining light which has been shaped by said at least two light altering devices into a composite light beam.

37. A method as in claim 35, wherein said producing, produces outputs for at least three light altering devices, and wherein said using comprises using said three light altering devices to form said composite beam of light.

38. A method as in claim 36, further comprising providing a first intensity color of light to a first light altering device, and a second intensity of light to a second light altering device.

39. A method as in claim 33, wherein said producing simultaneously produces output signals respectively indicative of different intensity components of the composite beam of light.

40. A method as in claim 33, wherein said digital light altering devices are digital mirror devices, and said outputs comprises three separate outputs which respectively drive two separate digital mirror devices.

41. A method as in claim 38, wherein said providing comprises providing said light over fiber optic cables.

42. A method comprising:
obtaining a signal to be used to shape a composite beam of light;
separating said signal into at least first and second different signals, at least one of which controls shaping a portion of said composite beam of light; and
providing said first and second signals simultaneously for use in shaping said light.

43. A method as in claim 42, further comprising using said first and second signals to simultaneously drive electronic devices which simultaneously produce first and second light parts.

44. A method as in claim 42, further comprising illuminating said electronic devices with light, and combining outputs of said electronic devices.

45. A method as in claim 42, wherein said aspect of light is light colors, and said first and second different signals simultaneously control different light colors.

46. A method as in claim 44, wherein said illuminating comprises using a fiber optic element to illuminate said electronic devices.

47. An apparatus, comprising:
means for forming first, second and third color components, each of which represents a primary color component of a desired shape and color for light; and
means for producing controlling signals to drive three digitally controllable light shape altering devices with the first, second and third color components, simultaneously.

48. An apparatus as in claim 47, further comprising digital mirror devices driven by color components.

49. An apparatus as in claim 47, wherein said primary color components comprise red, green and blue color components.

50. An apparatus comprising:
a computer which processes a digital file indicative of a color gobo shape to be projected; and
produces at least one output in a format to simultaneously and separately control at least two digital light shape altering devices to respective states indicative of said color gobo shape for each of two different colors.

51. An apparatus as in claim 50, further comprising first and second light shape altering devices, receiving said at least one output and each of said devices altering a shape of light which is passed thereby.

52. An apparatus as in claim 51, further comprising a light combining system that combines light which has been shaped by said first and second light shape altering devices into a composite light shape.

53. An apparatus as in claim 51, further comprising a third light shape altering device, and wherein said at least one output controls said third light shape altering device.

54. An apparatus as in claim 52, further comprising a first light source providing a first primary color of light to said first light shape altering device, and a second light source providing a second primary color of light to said second light shape altering device.

55. An apparatus as in claim 50, wherein said digital light shape altering devices are digital mirror devices, and said at least one output comprises two separate outputs which respectively drive two separate digital mirror devices.

56. An apparatus as in claim 51, wherein said providing comprises providing said light over fiber optic cables.

57. An apparatus as in claim 50, further comprising a light projecting system, projecting a light beam that is shaped based on said digital file.

58. An apparatus, comprising:
a computer, producing a digital file indicative of a desired composite light beam that includes at least one shaped part therein, and producing outputs which are adapted to simultaneously control at least two digital light altering devices to different states indicative of said composite light beam, and wherein at least one of said outputs represents a shape of said composite light beam.

59. An apparatus as in claim 58, further comprising, at least two light altering devices, controlled by said outputs.

60. An apparatus as in claim 59, wherein at least one of said light altering devices is operable to alter a shape of light which is passed thereby.

61. An apparatus as in claim 59, further comprising at least one light source, illuminating said at least two light shape altering devices and a light combining part, combining light output from said at least two light altering devices into a composite light shape.

62. An apparatus as in claim 59, further comprising a third light altering device, and wherein said using comprises using at least one of said first, second and/or third light altering devices to shape a beam of light which forms a portion of a composite beam.

63. An apparatus as in claim 61, wherein said at least one light source includes a first light source providing a first primary color of light to said first light shape altering device, and a second light source providing a second primary color of light to said second light altering device.

64. An apparatus as in claim 58, wherein said light altering devices are digital mirror devices, and said outputs comprises two separate outputs which respectively drive two separate digital mirror devices.

65. An apparatus as in claim 61, further comprising fiber optic cables providing light from said at least one light source to said light altering devices.

66. An apparatus, comprising:
a computer that processes at least one digital file indicative of a composite light beam formed of first and second image parts, and producing outputs which are formatted to simultaneously control at least two digital, pixel-level controllable, light altering devices to different states, indicative of said composite light beam formed of both said first image part and said second image part.

67. An apparatus as in claim 66, wherein at least one of said first and second image parts is an image of a gobo shape.

68. An apparatus as in claim 66, further comprising at least two light altering devices, controlled by said outputs.

69. An apparatus as in claim 66, further comprising a light source, providing light to said light shape altering devices, and a light combining element, combining light which has been modified by said at least two light altering devices into a composite light shape.

70. An apparatus as in claim 66, further comprising a third light altering device controlled by said outputs.

71. An apparatus as in claim 69, wherein said at least one light source further comprises a first light source providing a first color of light to said first light altering device, and a second light source providing a second color of light to a second light altering device.

72. An apparatus as in claim 66, wherein said digital light altering devices are digital mirror devices, and said outputs comprises two separate outputs which respectively drive two separate digital mirror devices.

73. An apparatus as in claim 69, further comprising fiber optic cables, providing said light from said at least one light source, to said light altering devices.

74. An apparatus, comprising:
a computer that produces a digital file indicative of a composite light beam formed of first and second image parts, and which produces outputs which are adapted to simultaneously control at least two pixel level controllable digital light altering devices to different states, indicative of said composite light beam, and wherein said outputs respectively represent states of light beams of different intensities that collectively form said composite light beam.

75. An apparatus as in claim 74, further comprising at least two light altering devices controlled by said outputs.

76. An apparatus as in claim 75, wherein at least one of said first and second image parts defines a shape of light which is passed.

77. An apparatus as in claim 76, further comprising a light combining element that combines light which has been shaped by said at least two light shape altering devices into a composite light beam.

78. An apparatus as in claim 74, further comprising a third light altering device.

79. An apparatus as in claim 75, further comprising a first light source providing a first intensity color of light to said first light altering device, and a second light source providing a second intensity of light to said second light altering device.

80. An apparatus as in claim 74, wherein said output signals respectively indicative of portions representing different intensity components of the composite light beam.

81. An apparatus as in claim 75, wherein said digital light altering devices are digital mirror devices, and said outputs comprises three separate outputs which respectively drive two separate digital mirror devices.

82. An apparatus as in claim 79, wherein said providing comprises providing said light over fiber optic cables.

83. A apparatus, comprising:
means for processing a digital file indicative of a color gobo shape to be projected, said processing means including means for producing outputs which are adapted to simultaneously control at least two digital light shape altering devices to states indicative of said color gobo shape for each of two different colors.

84. An apparatus as in claim 83, further comprising at least two light shape altering means for changing applied light based on said outputs.

85. An apparatus as in claim 84, further comprising means for projecting light to each of said at least two light shape altering means.

86. An apparatus as in claim 84, further comprising means for combining light which has been shaped by said at least two light shape altering means into a composite light shape.

87. An apparatus as in claim 85, wherein said projecting means comprises means for providing a first primary color of light to a first light shape altering means, and means for providing a second primary color of light to a second light shape altering means.

88. An apparatus as in claim 84, wherein said digital light shape altering means include digital mirror devices, and said outputs comprises two separate outputs which respectively drive two separate digital mirror devices.

89. An apparatus, comprising:
  means for processing a digital file indicative of a composite light beam, that includes at least one shaped part therein, said processing means comprising means for producing outputs which are adapted to simultaneously control at least two digital light altering devices to different states, indicative of said composite light beam, and wherein at least one of said outputs represents a shape of said composite light beam.

90. A apparatus as in claim 89, at least two light altering means for changing an applied light beam, based on said outputs.

91. A apparatus as in claim 90, further comprising means for providing light to said at least two light altering devices and means for combining light output from said at least two light altering devices, into a composite light shape.

92. An apparatus as in claim 91, wherein said providing means comprises first means for providing a first color of light to a first light altering device, and a second primary color of light to a second light altering device.

93. An apparatus as in claim 89, wherein said light altering means are digital mirror devices, and said outputs comprise two separate outputs which respectively drive two separate digital mirror devices.

94. An apparatus, comprising:
  means for processing at least one digital file indicative of a composite light beam formed of first and second image parts, said processing means including means for producing outputs which are adapted to simultaneously control at least two digital, pixel-level controllable, light altering devices to different states, indicative of said composite light beam formed of both said first image part and said second image part.

95. An apparatus as in claim 94, wherein at least one of said first and second image parts are an image of a gobo shape.

96. An apparatus as in claim 94, further comprising at least two light altering means for changing a light beam shape based on said outputs.

97. An apparatus as in claim 94, further comprising means for providing light to said light shape altering means, and means for combining light which has been modified by said at least two light altering means into a composite light shape.

98. An apparatus as in claim 97, wherein said providing means comprises first means for providing a first color of light to a first light altering device, and second means for providing a second color of light to a second light altering device.

99. A apparatus as in claim 94, wherein said digital light altering means include digital mirror devices, and said outputs comprises two separate outputs which respectively drive two separate digital mirror devices.

100. An apparatus, comprising:
  means for processing a digital file indicative of a composite light beam formed of first and second image parts, said processing means comprising means for producing outputs which are adapted to simultaneously control at least two pixel level controllable digital light altering devices to different states, indicative of said composite light beam, and wherein said outputs represents states of image portions of different intensities.

101. An apparatus as in claim 100, further comprising at least two light altering means for changing an aspect of applied light based on said outputs.

102. An apparatus as in claim 101, further comprising means for projecting light to said at least two light altering means.

103. An apparatus as in claim 102, further comprising means for combining light which has been shaped by said at least two light altering means into a composite light beam.

104. An apparatus as in claim 101, wherein said projecting means further comprises first means for providing a first intensity color of light to a first light altering means and second means for providing a second intensity of light to a second light altering means.

* * * * *